J. A. STEMPLE.
AUTOMOBILE SEAT.
APPLICATION FILED SEPT. 4, 1914.
1,160,781.
Patented Nov. 16, 1915.
2 SHEETS—SHEET 1.
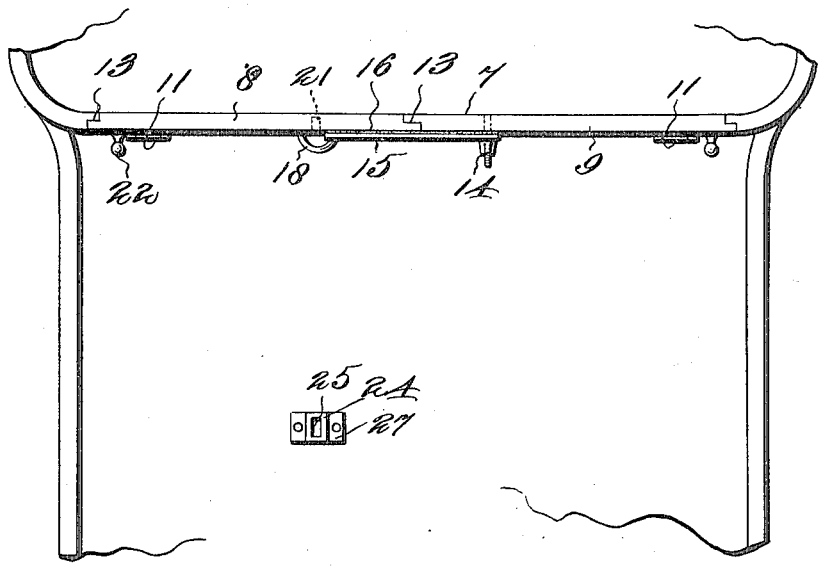
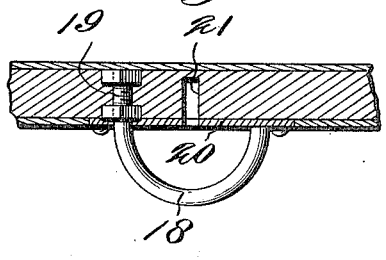
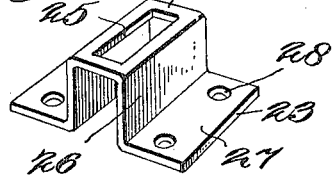
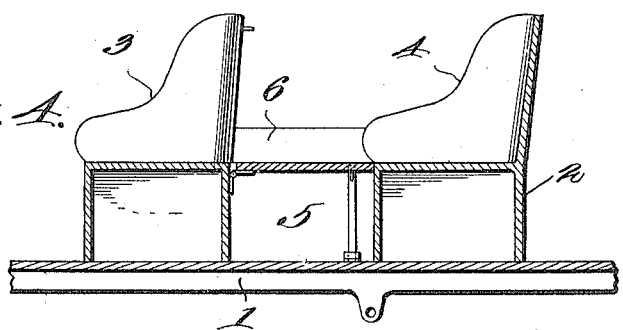
Inventor
J. A. Stemple,
Witnesses J. A. STEMPLE.
AUTOMOBILE SEAT.
APPLICATION FILED SEPT. 4, 1914.
1,160,781.
Patented Nov. 16, 1915.
2 SHEETS—SHEET 2.
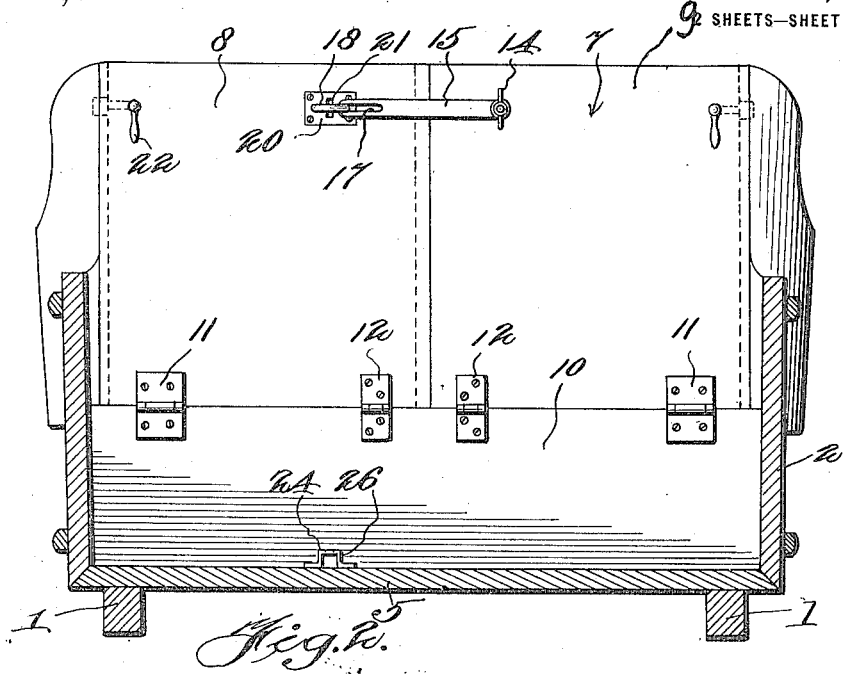
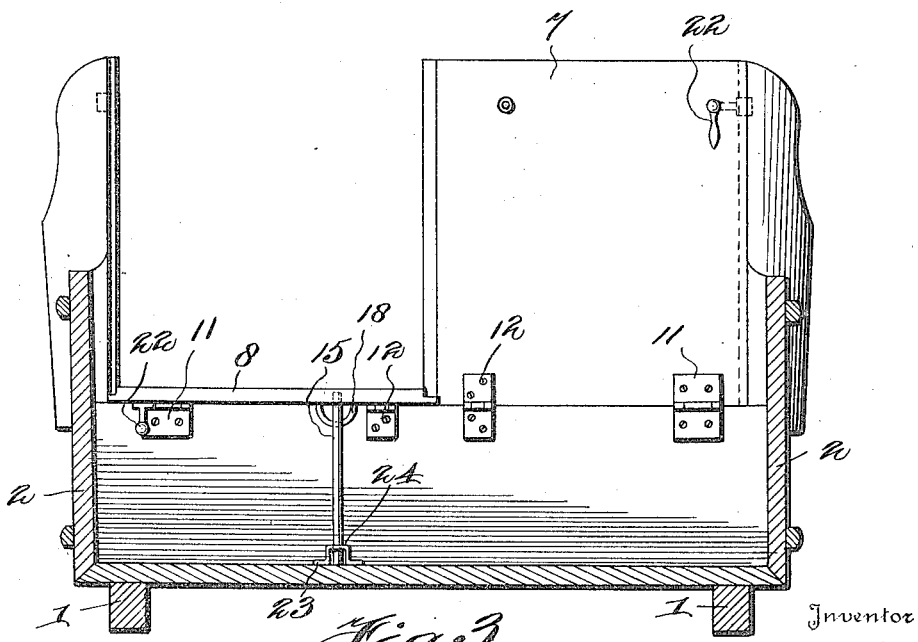
Inventor
J. A. Stemple,

UNITED STATES PATENT OFFICE.

JAMES A. STEMPLE, OF WEST LAFAYETTE, OHIO.

AUTOMOBILE-SEAT.

1,160,781.   Specification of Letters Patent.   Patented Nov. 16, 1915.

Application filed September 4, 1914. Serial No. 860,279.

*To all whom it may concern:*

Be it known that I, JAMES A. STEMPLE, a citizen of the United States, residing at West Lafayette, in the county of Coshocton and State of Ohio, have invented certain new and useful Improvements in Automobile-Seats; and I do hereby declare the following to be a full, clear, and exact description of the invention, such as will enable others skilled in the art to which it appertains to make and use the same.

This invention relates to new and useful improvements in automobile seats, and has for its principal object to provide a seat which may be used as a couch or seat at the desire of the user.

Another object of the invention is to provide a seat, half of which may be thrown into a reclining position to enable the driver of the vehicle in case of accident to place the injured party in the car and take said party to a hospital or place where proper treatment can be given.

A further object of the invention is to provide a means for supporting the seat in its raised or lowered position and preventing the same from coming out of alinement.

With these and other objects in view the invention consists in the combination and arrangement of parts which will be fully set forth in the following specification and in the accompanying drawing, in which:

Figure 1 is a plan view of a fragment of a car body illustrating in detail the method of supporting the back of the seat. Fig. 2 is a rear view showing the seat in its normal raised position. Fig. 3 is a view similar to Fig. 2 showing one half of the seat lowered. Fig. 4 is a longitudinal sectional view of a car body showing the seat in its lowered position. Fig. 5 is an enlarged detail sectional view of the central supporting means for the seat, and Fig. 6 is an enlarged perspective view of the floor plate.

Referring now to the drawings by characters of reference, the numeral 1 designates the chassis of a car of the usual construction provided with the body designated generally by the numeral 2. This body comprises the front and rear seats 3 and 4 respectively, and is provided with the usual floor 5. The usual side entrance doors 6 are formed in the side walls of the body and are arranged to permit ingress and egress therefrom.

The back of the front seat, which is designated generally by the numeral 7 comprises the two hinged panels 8 and 9 which are secured to the lower panel 10 by means of the hinges 11 and 12; each of these sections 8 and 9 is provided with the rabbeted edges 13 which are arranged to coöperate with each other in holding the back rigid when in its upward position.

Secured to the section 9 is a suitable bolt provided with thumb nuts 14 which is arranged to extend through an aperture formed in the hasp 15 which hasp is provided with the felt facing 16 to prevent injury to the polished back of the sections 8 and 9. This hasp is provided at the end opposite the aperture through which the bolt extends, with a longitudinal slot 17 through which the curved end 18 of the threaded stem 19 is arranged to extend. This curved end is bent to form a staple and hold the hasp in operative position. A suitable slotted plate 20 is provided and the slot in this plate is arranged to register with the recess 21 formed in the section 8 as clearly shown in Fig. 5. Suitable locking bolts 22 are secured to each of the elements 8 and 9 near its free edge and these bolts are arranged to engage the side walls of the vehicle body to hold the sections either in their raised or lowered position.

Secured to the floor 5 of the vehicle is the floor plate designated generally by the numeral 23 which is best illustrated in Fig. 6. This floor plate comprises the body 24 which is provided with the longitudinal slot 25, in which the free end of the hasp 15 is arranged to extend when the section is in its lowered position. Suitable vertical flanges 26 are formed on the body, and these flanges terminate in their lower extremities in the flanges 27 which are provided with the screw receiving apertures 28 by means of which the device is held to the floor.

It will be apparent from the foregoing that in use when it is desired to use the vehicle to transport an injured person, the section 8 may be released by unscrewing the thumb nut 14 from the bolt and releasing the bolt 22 from engagement with the side walls of the vehicle body. This will permit the section 8 to swing downwardly into the horizontal position illustrated in Figs. 3 and 4, and in this position, it will be apparent that the same will be supported by means of the hasp 15 which will engage in the slot 25 formed in the floor plate 23. The opposite corner will be supported by the bolt 22 which is arranged to engage in suitable recesses formed in the side walls of the vehicle. It will thus be seen, that a convenient and easily controlled device is provided, which may be easily and quickly thrown into either of the desired positions. Should it be desired to use the vehicle for sleeping purposes in case the occupants are traveling or camping out, it will be evident that both sections of the back may be lowered and will be supported in the manner hereinbefore described.

While in the foregoing there has been shown and described the preferred embodiment of this invention, it is to be understood that such changes in the combination and arrangement of parts as may fall within the scope of the claims may be resorted to without departing from the spirit and scope of the invention.

Having thus described the invention, what is claimed as new, is:—

1. The combination with an automobile body having the back of the front seat formed in two sections, of a hasp, said hasp being arranged to hold the back of the front seat in upward position and arranged to be swung downwardly to form a support for the seat when the latter is lowered.

2. An automobile body having a front seat formed in two sections, each of said sections being hinged to swing downwardly, means to lock the sections in their upward position, a loop carried by one of the sections, a hasp extending through the loop, means carried by the other section to engage the free end of the hasp and lock the two sections together, the section carrying the loop being provided with a recess, the end of the hasp being arranged to enter the recess and a plate supported on the floor of the car, said plate being arranged to engage the free end of the hasp and prevent the same from slipping when the section is lowered.

3. A vehicle body including a front and rear seat, the back of the front seat being formed in two independently hinged sections, bolts carried by each section and arranged to engage the sides of the body to hold the sections upwardly, a hasp, a loop securing the hasp to one section, the section being recessed, a slotted plate secured to the section the slot registering with the recess, a bolt carried by the opposite section, a wing nut arranged to engage the hasp and hold the same on the bolt and a plate secured to the floor of the rear portion of the vehicle, said plate being arranged to receive the free end of the hasp to hold the same in a vertical position and thereby support the free edge of the front seat sections.

In testimony whereof I affix my signature in presence of two witnesses.

JAMES A. STEMPLE.

Witnesses:
R. A. McClure,
J. T. West.

Copies of this patent may be obtained for five cents each, by addressing the "Commissioner of Patents, Washington, D. C."